United States Patent

[11] 3,576,422

| [72] | Inventors | William M. Beaupre<br>Los Angeles;<br>Donald R. Lien, La Habra, Calif. |
|---|---|---|
| [21] | Appl. No. | 841,073 |
| [22] | Filed | July 11, 1969 |
| [45] | Patented | Apr. 27, 1971 |
| [73] | Assignee | North American Rockwell Corporation |

[54] PRE-IONIZING WELDING APPARATUS
9 Claims, 1 Drawing Fig.

[52] U.S. Cl............................................ 219/130,
219/75, 219/135
[51] Int. Cl...................................................... B23k 9/00
[50] Field of Search................................................ 219/121
(P), 121, 135, 131, 75

[56] References Cited
UNITED STATES PATENTS

| 2,587,331 | 2/1952 | Jordan.......................... | 219/121X |
| 3,002,084 | 9/1961 | Sullivan........................ | 219/131X |
| 3,118,052 | 1/1964 | Lippart et al. ................ | 219/125X |
| 3,174,027 | 3/1965 | Manz............................ | 219/131 |
| 3,344,256 | 9/1967 | Anderson..................... | 219/121 |

*Primary Examiner*—J. V. Truhe
*Assistant Examiner*—C. L. Albritton
*Attorneys*—William R. Lane, Allan Rothenberg and Sidney Magnes ABSTRACT: Welding apparatus that eliminates the so-called "high frequency cracking"—while still using high frequency energy to minimize arc extinguishment, and to facilitate the starting of the welding arc.

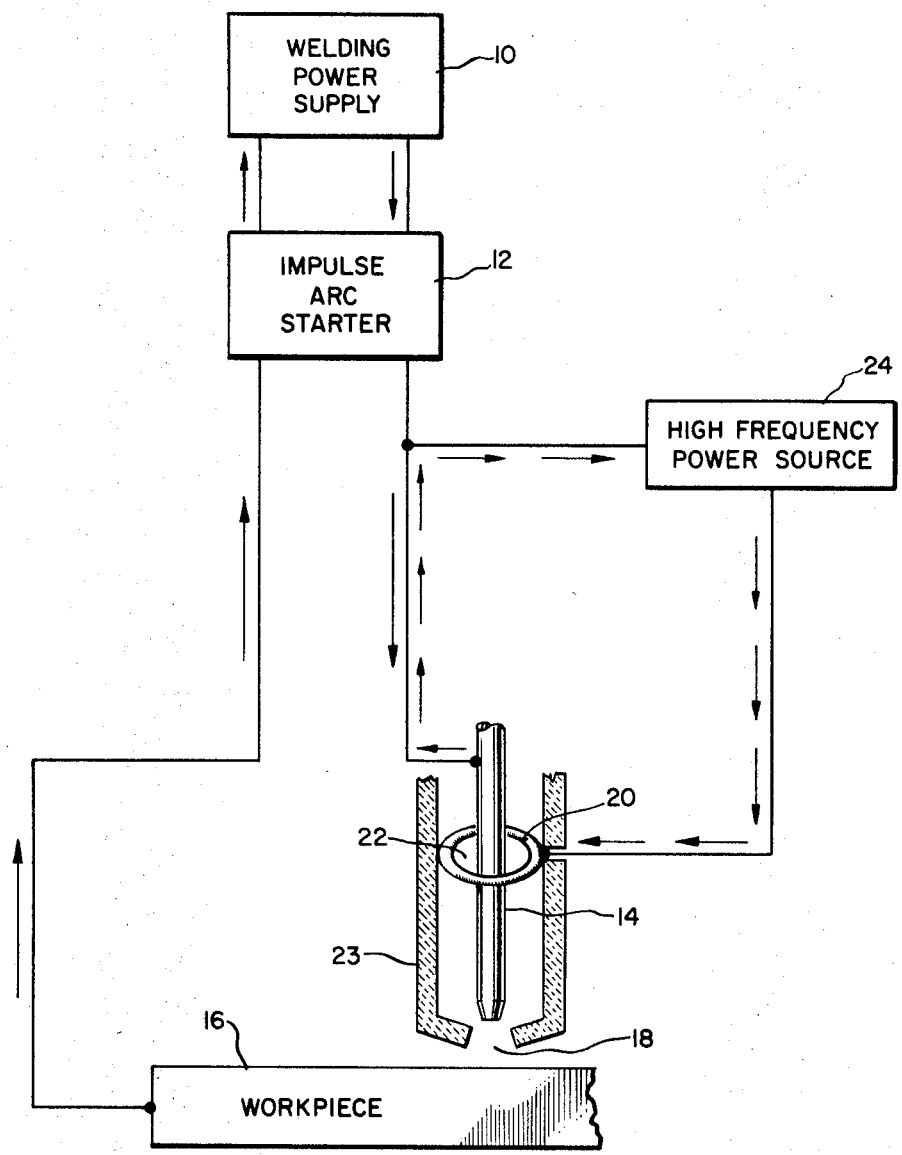

PRE-IONIZING WELDING APPARATUS

BACKGROUND

In electric-arc welding, well-known apparatus produces an electric arc that raises the temperature of the workpiece—and in some cases, a weld wire—to their melting temperatures, to form a "weld puddle"; the resultant weld puddle then solidifying to unite the articles being welded. In the Tungsten-electrode/Inert-Gas (TIG) welding technique, a tungsten rod forms one electrode; and the workpiece forms the other electrode—the electric arc being established in the welding area between these two electrodes.

In general, direct current (DC) is used; the polarity being such that the tungsten electrode is negative, while the workpiece is positive—this being known as "straight" polarity. In this straight polarity welding technique, electrons are emitted by the tungsten electrode; are accelerated to a high velocity; and then impinge upon the workpiece—the energy of impingement being converted to heat that produces the weld puddle.

While the negatively charged electrons are behaving as indicated above, positively charged "ions" (to be discussed more fully later) are behaving in the opposite manner; that is, they are being accelerated to—and are bombarding—the tungsten electrode.

However, ions are relatively heavy, and are relatively difficult to accelerate; and therefore the bombardment by the relatively slowly moving ions does not melt the tungsten electrode—but merely heats it to a temperature somewhat below its melting point. Since the tungsten electrode produces electrons more readily when it is heated, than when it is cold, the straight polarity provides additional electrons for the welding operation.

It has been found that exceptionally good quality welds may be produced if the workpiece is extremely clean. Therefore, the workpiece is precleaned by mechanical scrubbing, by chemical cleaning by etching, and the like. In order to maintain this clean condition, a source of inert gas produces a gas flow that envelopes the welding area; thus minimizing the possibility of externally caused contamination.

If the straight polarity described above is reversed (a state called "reverse" polarity), the now negatively charged workpiece is bombarded by the relatively heavy, relatively slow-moving positively charged ions; and this ion-bombardment cleans the workpiece in an extremely desirable manner. Since the cleaned workpiece is in an atmosphere of inert gas, it remains clean; and the "ionic-cleaning" thus help provide improved welding results.

In order to weld, and still take full advantage of the cleaning action produced by ion-bombardment of the workpiece, the polarity of the welding current must be periodically reversed from straight-polarity to reverse-polarity; this result being easily achieved by the use of an AC welding current, generally obtained directly from the 60 cycle per second power line.

The disadvantage of AC welding is as follows. During its reverse-polarity interval, the negatively charged electrons are accelerated toward the positively charged tungsten electrode; and the resultant high velocity electron-bombardment at the tungsten electrode overheats the tungsten electrode. In order to avoid melting the tungsten electrode, it therefore becomes desirable to minimize the duration of the reverse-polarity portion of the welding cycle; but this can not be achieved while using standard AC power—since the duration of the reverse portion is predetermined and invariable.

However, the duration of the reverse-polarity interval can be controlled by using—instead of standard AC power—either a "pulsed" DC or a "reversing" DC, whose reverse-polarity intervals can be adjusted. These techniques have worked satisfactorily; except that they introduce a new problem.

When the arc current is decreasing, preparatory to reversing its polarity, the electric voltage becomes progressively smaller; reaches a value of zero; and then increases in the opposite direction. During this transient phase, the welding arc extinguishes—apparently because there are neither enough electrons or ions, or suitable voltage conditions to maintain the welding arc. Therefore, as part of each reversal, it becomes necessary to reinitiate the welding arc; and this reinitiation is generally achieved by producing a short-duration high-voltage pulse that is called a "spike." This high-voltage spike, in all probability, has a dual action; one action being to produce electrons by so-called "cold emission," and the other action being to accelerate the electrons to collide with (and thus "ionize" some of the inert gas molecules)—this ionization providing electrons and ions for the arc initiation. Once the arc is initiated, the welding arc provides electrons and ions for ionization, welding, and the ionic-cleaning—as discussed above.

To summarize, the reverse-polarity has a desirable cleaning advantage; but also introduces two major problems. The first problem is that of arc extinguishment; this tending to produce an unsatisfactory variation of the weld. The second problem is that of producing—and the actual presence of —a high-voltage spike that may be dangerous to equipment and to personnel.

The above problems have been repeatedly investigated; and many solutions have been proposed. In general, the most satisfactory solution has been to use an arc-initiating spike between the electrode and the workpiece; this spike comprising high frequency energy that—in effect—produces thousands of individual high-voltage spikes in rapid succession. Thus, if the first individual spike should fail to initiate the arc, the subsequent spikes have both an individual and a cumulative ionization. The result of the numerous high-voltage high frequency spikes is to continually ionize the inert gas; and this ionization produces a copious supply of ions and electrons that are then available for minimizing arc extinguishment, and for facilitating arc establishment.

However, certain workpiece materials—for reasons that are not completely understood—are sensitive to high frequency energy; and resultant welds in these materials show a plurality of pits and minute fissures known as "high frequency cracks"—these being unsightly, and serving as a starting point for corrosion and for fatigue failures.

Another disadvantage of prior art high frequency arrangements was that the high frequency energy seemed to be present everywhere: at the workpiece, at the electrical cables, at the power source at the control panel, etc. The newer solid-state power supplies tend to be damaged, or fail to operate under these conditions; and must include safety features.

OBJECTS AND DRAWINGS

It is therefore an object of the present invention to provide an improved welding apparatus that minimizes high frequency problems.

The obtainment of this object and others will be realized from the following detailed description, taken in conjunction with the drawing, of which the only FIGURE is a block diagram of the disclosed apparatus.

DISCLOSURE

The drawing shows a welding power supply 10 that cooperates with any of the well-known impulse arc starters 12 (such as Impulse Arc Starter, Model 567-4 made by the Miller Electric Company of Appleton, Wisconsin) to produce an electric arc between a welding electrode 14 and a workpiece 16. The area between electrode 14 and workpiece 16 is designated as the welding area 18; and the flow path of welding current is indicated by the long arrows.

Adjacent welding electrode 14 is positioned an auxiliary electrode 20; the auxiliary electrode preferably being an electrically conductive material in the form of a ring that surrounds, and is concentric with, welding electrode 14. For reasons to be discussed later, the space between welding electrode 14 and auxiliary electrode 20 will be designated as the "ionization area" 22. One convenient way of producing the auxiliary electrode 20 is to place a loop of wire inside a "raw" ceramic nozzle; and then fuse the loop in place during the ceramic glazing operation. Another way of forming the auxiliary electrode is to use a metallic nozzle (e.g., stainless steel); coat its inner surface with a ceramic; and then wipe a narrow circle from the ceramic before the glazing operation. Other processes may of course be used; but the end result is an auxiliary electrode 20 located on the inner surface of the inert gas conducting channel 23.

A high frequency power source 24 has one connection to welding electrode 14, and has another connection to auxiliary electrode 20—the flow path of the high frequency current being indicated by the short arrows. High frequency source 24 may have a typical fundamental frequency of about 500,000 Hertz (and harmonics thereof), and a typical voltage of about 2,000 volts peak-to-peak. As a result, the high frequency energy from source 24 appears across the ionization area 22 between welding electrode 14 and auxiliary electrode 20. The rapidly recurring voltage peaks ionize the gas in ionization area 22, so that a copious supply of ions and electrons is available.

In the disclosed arrangement, the high frequency energy is confined to the ionization area 22, the welding electrode 14, and the auxiliary electrode 20; and is restricted from the workpiece and other portions of the welding apparatus. Thus, inert gas flowing through ionization area 22 is ionized by the high frequency energy; and it should be noted that high frequency source 24 needs to provide a voltage that is merely high enough to ionize the gas. The resultant ionized gaseous atmosphere encompasses the welding area; thus providing ions and electrons of arc initiation, minimizing of arc extinguishment, ionic-cleaning of the workpiece, ionic-heating of the tungsten electrode, and improved welding operation. Due to the copious supply of electrons and ions, the welding arc is initiated by a lower-valued starting spike from the power supply 10 and the arc starter 12; and for the same reason, the welding arc will maintain itself for small values of welding current. In this way, the welding arc starts more promptly, generally on the first attempt; and maintains itself longer before extinguishing. It has been found that with the disclosed device, the welding arc starts practically instantaneously every time—a tremendous improvement over prior art arrangements.

Moreover, the high frequency energy does not appear at workpiece 16, nor at any of the welding cables, nor at any of the other apparatus associated with the welding operation; and does not enter into the welding operation proper.

The above improvement is attained, as shown in the drawing, by connecting high frequency power source 24 in such a way that the high frequency energy is applied across the ionization area; making the ionization area 22 part of the high frequency circuit. Moreover, the connections between the high frequency power source 24 and the electrodes are such that they form paths that have a low resistance to the high frequency energy, thus additionally limiting the high frequency to the ionization area between the welding electrode 14 and the auxiliary electrode 20; and restricting the high frequency energy from other areas.

It should be noted that the high frequency arc is in the ionization area and does not form a path to the workpiece.

In accordance with the present disclosure, the high frequency power source 24 is energized continuously during the welding operation; i.e., it is not used for arc initiation, and then turned off. The continual presence of the high frequency energy in the ionization area produces a constant supply of preionized gas; has been found to provide improved welding- —probably because of the copious supply of ions and electrons for cleaning and arc purposes. Furthermore, if the welding arc should happen to be extinguished for any reason at all, the copious supply of ions and electrons facilitates reignition. It should also be noted that the high frequency is never switched to the workpiece, While the above explanation has been presented in terms of TIG welding, it is of course applicable to electric arc welding in general.

We claim:
1. The combination comprising:
a welding workpiece;
a welding electrode;
a welding power apparatus having a cable connected between said welding electrode and said power apparatus and a conductor connected between said workpiece and said power apparatus for producing an electric arc between said electrode and said workpiece;
 a. an auxiliary electrode positioned adjacent to and substantially circumjacent said welding electrode, said welding and auxiliary electrodes forming an ionization area;
 b. a stream of ionizable gas flowing continuously through said ionization area;
 c. a source of high frequency energy;
 d. means for continuously applying the high frequency energy from said source to only said welding electrode and said auxiliary electrode, for ionizing the gas therebetween, said ionizing gas forming an ionized gaseous envelope that continuously surrounds said welding area;
said high frequency energy being isolated from said workpiece and from the cables and welding power apparatus associated with the welding operation.
2. The combination of claim 1 including:
means, comprising a tubular conduit surrounding the welding electrode and spaced therefrom, for directing said gas past the welding electrode toward the workpiece;
said auxiliary electrode comprising a toroidal element carried by and positioned within the conduit at a point spaced from the end of the welding electrode adjacent the workpiece.
3. Welding apparatus comprising:
A. a welding workpiece;
B. a welding torch comprising:
 a. a welding electrode;
 b. an auxiliary welding electrode positioned adjacent said welding-electrode, the space between said electrodes defining an ionization area;
C. means for providing a flow of ionizable gas through said ionization area;
D. a welding power supply having two output terminals;
E. an electrical connection between said workpiece and a first output terminal of said welding power supply;
F. an electrical connection between said welding electrode and the second output terminal of said welding power supply;
G. a high frequency power source having two output terminals;
H. an electrical connection, having a low resistance to high frequency energy, permanently connected between said welding electrode and a first output terminal of said high frequency power supply;
I. an electrical connection, having a low resistance to high frequency energy, permanently connected between said auxiliary electrode and a second output terminal of said high frequency power supply;
J. means for continuously energizing said high frequency power source for continuously ionizing the gas in said ionization area, for producing a continuous ionized gas envelope in said ionization area;
K. said high frequency energy being isolated from said workpiece and said welding power supply.
4. In combination:
a welding electrode;
a workpiece;
means, including a power supply and an impulse starter, for passing welding current through a circuit path including the welding electrode and the workpiece;
a source of high frequency energy having a connection to the welding electrode; and
means, comprising a separate circuit path substantially independent of said workpiece, for directing current from said high frequency source to and from said welding electrode, said last mentioned means comprising an auxiliary electrode circumscribing the welding electrode at a distance from said workpiece, and electrically connected to the high frequency source.

5. A welding apparatus for welding a workpiece, said apparatus comprising:
- a welding electrode adapted to be placed near the workpiece for welding thereof;
- a first electric power source adapted for connection across said welding electrode and said workpiece for supplying welding heat in the form of a welding arc;
- an auxiliary electrode disposed near said welding electrode and in fixed relation therewith;
- said auxiliary electrode, in addition being disposed at a more remote distance from said workpiece than said welding electrode whenever the welding arc is formed; and
- a second electric power source connected across said welding electrode and said auxiliary electrode and having sufficient energy to maintain another arc between both of said electrodes.

6. The apparatus of claim 5 wherein:
said first power source is an alternating current having a first frequency.

7. The apparatus of claim 6 wherein:
said second power source is an alternating current having second frequency which is at higher rate than said first frequency.

8. The apparatus of claim 6 wherein:
said auxiliary electrode has the form of a ring disposed around said welding electrode and spaced from the tip thereof; and
means are included for passing a flow of ionizable gas between said electrodes towards the tip of said welding electrode.

9. The apparatus of claim 7 wherein;
said auxiliary electrode has the form of a ring disposed around said welding electrode and spaced from the tip thereof; and
means are included for passing a flow of ionizable gas between said electrodes towards the tip of said welding electrode.